(12) United States Patent
He

(10) Patent No.: US 12,096,340 B2
(45) Date of Patent: Sep. 17, 2024

(54) INFORMATION INDICATION METHOD, APPARATUS, SYSTEM AND DEVICE, AND STORAGE MEDIUM

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 440 days.

(21) Appl. No.: 17/398,825

(22) Filed: Aug. 10, 2021

(65) Prior Publication Data

US 2021/0368424 A1 Nov. 25, 2021

Related U.S. Application Data

(63) Continuation of application No. PCT/CN2019/075287, filed on Feb. 15, 2019.

(51) Int. Cl.
*H04W 48/10* (2009.01)
*H04W 48/16* (2009.01)
*H04W 88/14* (2009.01)

(52) U.S. Cl.
CPC .......... *H04W 48/10* (2013.01); *H04W 48/16* (2013.01); *H04W 88/14* (2013.01)

(58) Field of Classification Search
CPC ...... H04W 48/10; H04W 48/16; H04W 88/14
See application file for complete search history.

(56) References Cited

U.S. PATENT DOCUMENTS

| 2012/0021794 A1 | 1/2012 | Shen et al. | |
| 2020/0084819 A1* | 3/2020 | Abedini | H04W 76/15 |
| 2021/0105710 A1* | 4/2021 | Kimba Dit Adamou | H04W 88/14 |
| 2022/0110047 A1* | 4/2022 | Ishii | H04W 48/12 |

FOREIGN PATENT DOCUMENTS

| CN | 102215594 A | 10/2011 |
| CN | 102355698 A | 2/2012 |
| CN | 103581960 A | 2/2014 |
| CN | 105872943 A | 8/2016 |
| CN | 108370497 A | 8/2018 |
| CN | 110636584 A | 12/2019 |

OTHER PUBLICATIONS

International Search Report issued in corresponding International Application No. PCT/CN2019/075287, mailed Nov. 12, 2019, 29 pages.

(Continued)

*Primary Examiner* — Chae S Lee
(74) *Attorney, Agent, or Firm* — BAYES PLLC

(57) ABSTRACT

Embodiments of the present disclosure disclose an information indication method, apparatus, system, device, and a storage medium. The method is applied to a first integrated access and backhaul (IAB) base station, and includes sending indication information, wherein the indication information is used for indicating whether access of another IAB base station is allowable.

6 Claims, 6 Drawing Sheets

(56) References Cited

OTHER PUBLICATIONS

PCT Written Opinion of the International Searching Authority issued in corresponding International Application No. PCT/CN2019/075287, mailed Nov. 12, 2019, 9 pages.
"Access Control for IAB node", Agenda Item : 11.1.3, Source : LG Electronics Inc., 3GPP TSG-RAN WG2 #104 R2-18 18415, Spokane, USA, Nov. 12-16, 2018, 3 pages.
3rd Generation Partnership Project; Technical Specification Group Radio Access Network; NR; User Equipment (UE) procedures in Idle mode and RRC Inactive state (Release 15), 3GPP TS 38.304 V15.2.0 (Dec. 2018), 28 pages.
Second Office Action issued in corresponding Chinese Application No. 202110374217.9, mailed May 25, 2022.
3GPP TS 38.331 V15.2.0 (Jun. 2018); Technical Specification Group Radio Access Network; NR; Radio Resource Control (RRC) protocol specification (Release 15).
First Office Action issued in corresponding European application No. 19914833.9, mailed Oct. 4, 2022.
3GPP TS 22.261 V16.6.0 (Dec. 2018); Technical Sepecification Group Services and System Aspects; Service requirements for the 5G system; Stage 1 (Release 16).
Extended European Search Report issued in corresponding European Application No. 19914833.9, mailed Jan. 4, 2022, 19 pages.
First office action issued in corresponding Chinese Application No. 202110374217.9, mailed Dec. 28, 2021, 18 pages.
"PHY layer enhancements for NR IAB", Agenda item: 7.2.3.1, Source: Intel Corporation, 3GPP TSG RAN WG1 #94, R1-1808691, Aug. 20-Aug. 24, 2018, Gothenburg, Sweden, 13 pages.
"3rd Generation Partnership Project; Technical Specification Group Radio Access Network; NR-Study on Integrated Access and Backhaul; (Release 16)", 3G pp TR 38.87 4 V16.0.0 (Dec. 2018), 111 pages.
"TP for 38.874 capturing RAN1 agreements on IAB", Agenda Item: 7.7.1, Source: AT&T, 3GPP TSG RAN WG1 Meeting #93, R1-1807850, Busan, Korea, May 21-25, 2018, 8 pages.
"Access restrictions (barring) in IAB", Agenda Item: 11.1.3, Source: Sharp, 3GPP TSG RAN WG2 Meeting #105 R2-1901718, Athens, Greece, Feb. 25-Mar. 1, 2019, 3 pages.

* cited by examiner

INFORMATION INDICATION METHOD, APPARATUS, SYSTEM AND DEVICE, AND STORAGE MEDIUM

CROSS-REFERENCE TO RELATED APPLICATION

This application is a continuation of International Application No. PCT/CN2019/075287, filed on Feb. 15, 2019, the entire contents of which are incorporated herein by reference.

BACKGROUND

The present disclosure relates to the field of communication technologies, and more particularly, to an information indication method, an apparatus, a system and a device, and a storage medium.

An IAB (integrated access and backhaul) base station integrates a radio access link and a radio backhaul link. The radio access link is a communication link between a UE (user equipment) and the IAB base station, and the radio backhaul link is a communication link between the IAB base station and another IAB base station for data backhaul.

At present, the IAB base station controls the UE's access through access indication information of a cell status, but there is no related technical record regarding how to control the IAB base station. Therefore, how to control the IAB base station has become a hot research topic.

SUMMARY

Embodiments of the present disclosure provide an information indication method, an apparatus, a system and a device, and a storage medium.

A first aspect provides an information indication method, which is applied to a first integrated access and backhaul (IAB) base station, and the method includes sending indication information, wherein the indication information is used for indicating whether access of another IAB base station is allowable.

Optionally, sending the indication information includes sending at least one of system information and broadcast information, wherein the at least one of the system information and the broadcast information includes the indication information.

Optionally, sending the at least one of the system information and the broadcast information includes sending the system information, wherein the system information includes a first parameter and a second parameter, the first parameter is used for indicating whether to reserve a cell for operator use, and the second parameter is used for indicating whether to reserve a cell for other use; and sending the broadcast information, wherein the broadcast information includes master information block (MIB) information, and the MIB information includes first cell barring information, wherein at least one of the first parameter and the second parameter and the first cell barring information constitute the indication information.

Optionally, when content of the at least one of the first parameter and the second parameter and content of the first cell barring information satisfy a first reference condition, the indication information is used for indicating the access of the other IAB base station is allowable; and when the content of the at least one of the first parameter and the second parameter and the content of the first cell barring information do not satisfy the first reference condition, the indication information is used for indicating the access of the other IAB base station is not allowable.

Optionally, the first reference condition includes at least one of the following: the first cell barring information indicates that access to the first IAB base station is barred, and the second parameter indicates to reserve the cell for other use; the first cell barring information indicates that access to the first IAB base station is barred, and the first parameter indicates to reserve the cell for operator use; the first cell barring information indicates that access to the first IAB base station is barred, and the first parameter indicates to reserve the cell for operator use, and the second parameter indicates to reserve the cell for other use; the first cell barring information indicates that access to the first IAB base station is barred, and the first parameter indicates to reserve the cell for operator use, or the second parameter indicates to reserve the cell for other use; the first cell barring information indicates that access to the first IAB base station is not barred, and the first parameter indicates to reserve the cell for operator use, and the second parameter indicates to reserve the cell for other use; the first cell barring information indicates that access to the first IAB base station is not barred, and the second parameter indicates to reserve the cell for other use.

Optionally, sending the at least one of the system information and the broadcast information includes sending the broadcast information, wherein the broadcast information includes master information block (MIB) information, and the indication information is located in the MIB information.

Optionally, sending the at least one of the system information and the broadcast information includes sending the system information, wherein the system information includes a first parameter and a second parameter, the first parameter is used for indicating whether to reserve a cell for operator use, and the second parameter is used for indicating whether to reserve a cell for other use; and sending the broadcast information, wherein the broadcast information includes master information block (MIB) information, the MIB information carries second cell barring information, and the second cell barring information is used for indicating whether the first IAB base station is in an access barred status, wherein at least one of the first parameter and the second parameter and the second cell barring information of the MIB information constitute the indication information.

Optionally, when the second cell barring information indicates that the first IAB base station is in the access barred status, the indication information indicates that the access of the other IAB base station is not allowable; when the second cell barring information indicates that the first IAB base station is in an access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

Optionally, the second reference condition includes at least one of the following: the first parameter indicates not to reserve the cell for operator use, and the second parameter indicates not to reserve the cell for other use; and the first parameter indicates to reserve the cell for operator use.

Optionally, sending the at least one of the system information and the broadcast information includes sending the broadcast information, wherein the broadcast information includes an additional bit other than MIB information, and the indication information is located in the additional bit.

Optionally, the system information is system information block (SIB) 1 information.

Optionally, sending the indication information includes broadcasting the indication information.

A second aspect provides an information indication method, which is applied to a second integrated access and backhaul (IAB) base station, and the method includes receiving indication information, wherein the indication information is used for indicating whether access of another IAB base station to a first IAB base station is allowable; and determining whether to access the first IAB base station based on the indication information.

Optionally, receiving the indication information includes receiving at least one of system information and broadcast information, wherein the at least one of the system information and the broadcast information includes the indication information.

Optionally, receiving the at least one of the system information and the broadcast information, wherein the at least one of the system information and the broadcast information includes the indication information, includes receiving the system information, wherein the system information includes a first parameter and a second parameter, the first parameter is used for indicating whether to reserve a cell for operator use, and the second parameter is used for indicating whether to reserve a cell for other use; receiving the broadcast information, wherein the broadcast information includes master information block (MIB) information, and the MIB information includes first cell barring information; and reading at least one of the first parameter and the second parameter and the first cell barring information to obtain the indication information.

Optionally, when content of the at least one of the first parameter and the second parameter and content of the first cell barring information satisfy a first reference condition, the indication information is used for indicating that the access of the other IAB base station is allowable; and when the content of the at least one of the first parameter and the second parameter and the content of the first cell barring information do not satisfy the first reference condition, the indication information is used for indicating that the access of the other IAB base station is not allowable.

Optionally, the first reference condition includes at least one of the following: the first cell barring information indicates that access to the first IAB base station is barred, and the second parameter indicates to reserve the cell for other use; the first cell barring information indicates that access to the first IAB base station is barred, and the first parameter indicates to reserve the cell for operator use; the first cell barring information indicates that access to the first IAB base station is barred, and the first parameter indicates to reserve the cell for operator use, and the second parameter indicates to reserve the cell for other use; the first cell barring information indicates that access to the first IAB base station is barred, and the first parameter indicates to reserve the cell for operator use, or the second parameter indicates to reserve the cell for other use; the first cell barring information indicates that access to the first IAB base station is not barred, and the first parameter indicates to reserve the cell for operator use, and the second parameter indicates to reserve the cell for other use; the first cell barring information indicates that access to the first IAB base station is not barred, and the second parameter indicates to reserve the cell for other use.

Optionally, receiving the at least one of the system information and the broadcast information, wherein the at least one of the system information and the broadcast information includes the indication information, includes receiving the broadcast information, wherein the broadcast information includes master information block (MIB) information, and the indication information is located in the MIB information; and reading the indication information in the MIB information.

Optionally, receiving the at least one of the system information and the broadcast information, wherein the at least one of the system information and the broadcast information includes the indication information, includes receiving the system information, wherein the system information includes a first parameter and a second parameter, the first parameter is used for indicating whether to reserve a cell for operator use, and the second parameter is used for indicating whether to reserve a cell for other use; receiving the broadcast information, wherein the broadcast information includes master information block (MIB) information, the MIB information carries second cell barring information, and the second cell barring information is used for indicating whether the first IAB base station is in an access barred status; and reading at least the second cell barring information of the MIB information to obtain the indication information.

Optionally, reading at least the second cell barring information of the MIB information to obtain the indication information includes reading the second cell barring information of the MIB information to obtain the indication information; determining that the indication information indicates that the access of the other IAB base station is not allowable when the second cell barring information indicates that the first IAB base station is in the access barred status; and continuing to read at least one of the first parameter and the second parameter to obtain the indication information when the second cell barring information indicates that the first IAB base station is in an access non-barred status.

Optionally, when the second cell barring information indicates that the first IAB base station is in the access barred status, the indication information indicates that the access of the other IAB base station is not allowable; when the second cell barring information indicates that the first IAB base station is in the access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

Optionally, the second reference condition includes at least one of the following: the first parameter indicates not to reserve the cell for operator use, and the second parameter indicates not to reserve the cell for other use; the first parameter indicates to reserve the cell for operator use.

Optionally, receiving the at least one of the system information and the broadcast information, wherein the at least one of the system information and the broadcast information includes the indication information, includes receiving the broadcast information, wherein the broadcast information includes an additional bit other than MIB information, and the indication information is located in the additional bit; and reading the indication information in the additional bit.

Optionally, the system information is system information block (SIB) 1 information.

A third aspect provides an information indication device, which is configured in a first integrated access and backhaul (IAB) base station, and the device includes a sending module, configured to send indication information, wherein the indication information is used for indicating whether access of another IAB base station is allowable.

Optionally, the sending module is configured to send at least one of system information and broadcast information, wherein the at least one of the system information and the broadcast information includes the indication information.

Optionally, the sending module is configured to send the system information, wherein the system information includes a first parameter and a second parameter, the first parameter is used for indicating whether to reserve a cell for operator use, and the second parameter is used for indicating whether to reserve a cell for other use; and send the broadcast information, wherein the broadcast information includes master information block (MIB) information, and the MIB information includes first cell barring information, wherein at least one of the first parameter and the second parameter and the first cell barring information constitute the indication information.

Optionally, when content of the at least one of the first parameter and the second parameter and content of the first cell barring information satisfy a first reference condition, the indication information is used for indicating that the access of the other IAB base station is allowable; and when the content of the at least one of the first parameter and the second parameter and the content of the first cell barring information do not satisfy the first reference condition, the indication information is used for indicating that the access of the other IAB base station is not allowable.

Optionally, the first reference condition includes at least one of the following: the first cell barring information indicates that access to the first IAB base station is barred, and the second parameter indicates to reserve the cell for other use; the first cell barring information indicates that access to the first IAB base station is barred, and the first parameter indicates to reserve the cell for operator use; the first cell barring information indicates that access to the first IAB base station is barred, and the first parameter indicates to reserve the cell for operator use, and the second parameter indicates to reserve the cell for other use; the first cell barring information indicates that access to the first IAB base station is barred, and the first parameter indicates to reserve the cell for operator use, or the second parameter indicates to reserve the cell for other use; the first cell barring information indicates that access to the first IAB base station is not barred, and the first parameter indicates to reserve the cell for operator use, and the second parameter indicates to reserve the cell for other use; the first cell barring information indicates that access to the first IAB base station is not barred, and the second parameter indicates to reserve the cell for other use.

Optionally, the sending module is configured to send the broadcast information, wherein the broadcast information includes master information block (MIB) information, and the indication information is located in the MIB information.

Optionally, the sending module is configured to send the system information, wherein the system information includes a first parameter and a second parameter, the first parameter is used for indicating whether to reserve a cell for operator use, and the second parameter is used for indicating whether to reserve a cell for other use; and send the broadcast information, wherein the broadcast information includes master information block (MIB) information, the MIB information carries second cell barring information, and the second cell barring information is used for indicating whether the first IAB base station is in an access barred status, wherein at least one of the first parameter and the second parameter and the second cell barring information of the MIB information constitute the indication information.

Optionally, when the second cell barring information indicates that the first IAB base station is in the access barred status, the indication information indicates that the access of the other IAB base station is not allowable; when the second cell barring information indicates that the first IAB base station is in an access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

Optionally, the second reference condition includes at least one of the following: the first parameter indicates not to reserve the cell for operator use, and the second parameter indicates not to reserve the cell for other use; the first parameter indicates to reserve the cell for operator use.

Optionally, the sending module is configured to send the broadcast information, wherein the broadcast information includes an additional bit other than MIB information, and the indication information is located in the additional bit.

Optionally, the system information is system information block (SIB) 1 information.

Optionally, the sending module is configured to broadcast the indication information.

A fourth aspect provides an information indication device, which is configured in a second integrated access and backhaul (IAB) base station, and the device includes a receiving module, configured to receive indication information, wherein the indication information is used for indicating whether access of another IAB base station to access the first IAB base station is allowable; and a determining module, configured to determine whether to access a first IAB base station based on the indication information.

Optionally, the receiving module is configured to receive at least one of system information and broadcast information, wherein the at least one of the system information and the broadcast information includes the indication information.

Optionally, the receiving module is configured to receive the system information, wherein the system information includes a first parameter and a second parameter, the first parameter is used for indicating whether to reserve a cell for operator use, and the second parameter is used for indicating whether to reserve a cell for other use; receive the broadcast information, wherein the broadcast information includes master information block (MIB) information, and the MIB information includes first cell barring information; and read at least one of the first parameter and the second parameter and the first cell barring information to obtain the indication information.

Optionally, when content of the at least one of the first parameter and the second parameter and content of the first cell barring information satisfy a first reference condition, the indication information is used for indicating that the access of the other IAB base station is allowable; and when the content of the at least one of the first parameter and the second parameter and the content of the first cell barring information do not satisfy the first reference condition, the indication information is used for indicating that the access of the other IAB base station is not allowable.

Optionally, the first reference condition includes at least one of the following: the first cell barring information indicates that access to the first IAB base station is barred, and the second parameter indicates to reserve the cell for other use; the first cell barring information indicates that access to the first IAB base station is barred, and the first parameter indicates to reserve the cell for operator use; the first cell barring information indicates that access to the first IAB base station is barred, and the first parameter indicates to reserve the cell for operator use, and the second parameter indicates to reserve the cell for other use; the first cell barring information indicates that access to the first IAB base station is barred, and the first parameter indicates to reserve the cell for operator use, or the second parameter indicates to reserve the cell for other use; the first cell barring information indicates that access to the first IAB base station is not barred, and the first parameter indicates to reserve the cell for operator use, and the second parameter indicates to reserve the cell for other use; the first cell barring information indicates that access to the first IAB base station is not barred, and the second parameter indicates to reserve the cell for other use.

Optionally, the receiving module is configured to receive the broadcast information, wherein the broadcast information includes master information block (MIB) information, and the indication information is located in the MIB information; and read the indication information in the MIB information.

Optionally, the receiving module is configured to receive the system information, wherein the system information includes a first parameter and a second parameter, the first parameter is used for indicating whether to reserve a cell for operator use, and the second parameter is used for indicating whether to reserve a cell for other use; receive the broadcast information, wherein the broadcast information includes master information block (MIB) information, the MIB information carries second cell barring information, and the second cell barring information is used for indicating whether the first IAB base station is in an access barred status; and read at least the second cell barring information of the MIB information to obtain the indication information.

Optionally, the receiving module is configured to read the second cell barring information of the MIB information to obtain the indication information; determine that the indication information indicates that the access of the other IAB base station is not allowable when the second cell barring information indicates that the first IAB base station is in an access barred status; and continue to read at least one of the first parameter and the second parameter to obtain the indication information when the second cell barring information indicates that the first IAB base station is in an access non-barred status.

Optionally, when the second cell barring information indicates that the first IAB base station is in the access barred status, the indication information indicates that the access of the other IAB base station is not allowable; when the second cell barring information indicates that the first IAB base station is in the access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

Optionally, the second reference condition includes at least one of the following: the first parameter indicates not to reserve the cell for operator use, and the second parameter indicates not to reserve the cell for other use; the first parameter indicates to reserve the cell for operator use.

Optionally, the receiving module is configured to receive the broadcast information, wherein the broadcast information includes an additional bit other than MIB information, and the indication information is located in the additional bit; and read the indication information in the additional bit.

Optionally, the system information is system information block (SIB) 1 information.

A fifth aspect provides a communication system, including a first integrated access and backhaul (TAB) base station and a second TAB base station. The first TAB base station includes the device of the above third aspect, and the second TAB base station includes the device of the above fourth aspect.

A sixth aspect provides a first TAB base station. The first TAB base station includes a processor and a memory. The memory stores one or more computer programs, and the processor, when executing the computer programs, implements the method described in the above first aspect.

A seventh aspect provides a second TAB base station. The second TAB base station includes a processor and a memory. The memory stores one or more computer programs, and the processor, when executing the computer programs, implements the method described in the above second aspect.

An eighth aspect provides a computer-readable storage medium having instructions stored thereon, wherein the instructions, when being executed by a processor, implement steps of the method described in the above first aspect.

A ninth aspect provides a computer-readable storage medium having instructions stored thereon, wherein the instructions, when being executed by a processor, implement steps of the method described in the above second aspect.

A tenth aspect provides a computer program product containing instructions that, when runs on a computer, causes the computer to execute the method described in the above first aspect.

An eleventh aspect provides a computer program product containing instructions that, when it runs on a computer, causes the computer to execute the method described in the above second aspect.

BRIEF DESCRIPTION OF THE DRAWINGS

In order to explain technical solutions in embodiments of the present disclosure more clearly, the following will briefly introduce drawings needed in the description of the embodiments. Obviously, the drawings in the following description are only some embodiments of the present disclosure. For those of ordinary skill in the art, other drawings can be obtained from these drawings without creative labor.

DETAILED DESCRIPTION

Figure 1:
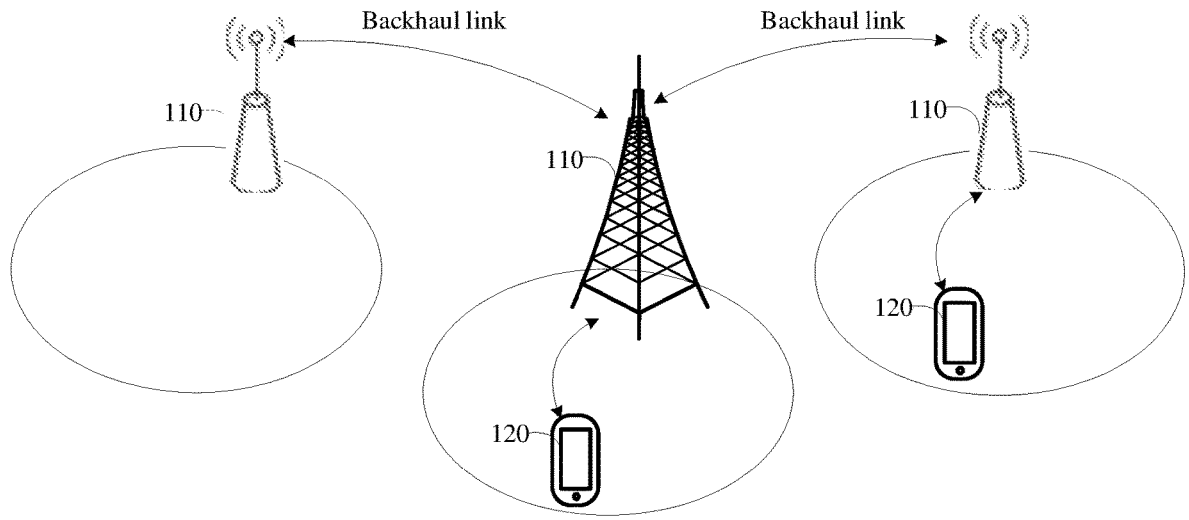
FIG. 1 is a schematic diagram showing an implementation environment according to an exemplary embodiment.

In order to make objectives, technical solutions, and advantages of the present disclosure clearer, the following will further describe embodiments of the present disclosure in detail with reference to the drawings.

Before describing an information indication method provided by the embodiments of the present disclosure in detail, terms, application scenarios, and implementation environment involved in the embodiments of the present disclosure are briefly described first.

First, terms involved in the embodiments of the present disclosure are described briefly.

Backhaul link may be also referred to as a radio backhaul link, which means a communication link between IAB base stations for data backhaul.

Broadcast information is information carried by a physical broadcast channel (PBCH), and includes master information block (MIB) information from a higher layer and 8-bit information from layer 1. The layer 1 is generally understood as a physical layer.

MIB information has a total of A bits (where A is a positive integer), includes a part of information required by a device (such as a UE) to access a base station, such as cellbarred, etc., where the cellbarred is used for indicating an access control status of a cell. Specifically, the MIB information includes 6-bit system frame number (SFN), 1-bit sub-carrier spacing information, 4-bit sub-carrier offset of synchronization signal block (SSB), demodulation reference signal (DMRS) related information, resource information for scheduling a physical downlink control channel (PDCCH) of system information block (SIB), and the like. In addition, the MIB information also includes an idle bit. In a standard, the MIB information is specifically defined as follows:

```
MIB ::= SEQUENCE {
systemFrameNumber BIT STRING (SIZE (6)),
subCarrierSpacingCommon ENUMERATED {scs15or60, scs30or120},
ssb-SubcarrierOffset INTEGER (0..15),
dmrs-TypeA-Position ENUMERATED {pos2, pos3},
pdcch-ConfigSIB1 PDCCH-ConfigSIB1,
cellBarred ENUMERATED {barred, notBarred},
intraFreqReselection ENUMERATED {allowed, notAllowed},
spare BIT STRING (SIZE (1))
}
```

The 8-bit information of layer 1 refers to information of the information carried by the PBCH other than MIB. For ease of description, bits where the 8-bit information is located are recorded as $\bar{a}_{\bar{q}}$, $\bar{a}_{\bar{q}+1}$, $\bar{a}_{\bar{q}+2}$, $\bar{a}_{\bar{q}+3}$, . . . , $\bar{a}_{\bar{q}+7}$. In general, information in $\bar{a}_{\bar{q}}$, $\bar{a}_{\bar{q}+1}$, $\bar{a}_{\bar{q}+2}$, $\bar{a}_{\bar{q}+3}$ is used for indicating the lowest 4 bits of SFN; information in $\bar{a}_{\bar{q}+7}$ is half-frame indication information, that is, indicating whether the bit is a first half frame or a second half frame. When a system frequency band of the IAB base station is greater than 6 GHz (i.e., $L_{SSB}$=64) $\bar{a}_{\bar{q}+5}$, $\bar{a}_{\bar{q}+6}$, $\bar{a}_{\bar{q}+7}$ is the highest 3 bits of the PBCH numbers; otherwise, when the system frequency band is less than 6 GHz, that is, $L_{SSB}$ is less than 64, information related to the layer 1 has 2-bit reserved bits. Specifically, $\bar{a}_{\bar{q}+5}$ is the highest bit of parameter $k_{SSB}$ and $\bar{a}_{\bar{q}+6}$, $\bar{a}_{\bar{q}+7}$ are the reserved bits. $L_{SSB}$ is the maximum number of SSBs, and $k_{SSB}$ is the subcarrier offset information of the SSB. For ease of description, the bits where the 8-bit information of the layer 1 is located may be referred to as additional bits.

System information is another part of the information required for the device to access the base station, that is, constituting all the information required for the device to access the base station with the MIB information. The system information may be SIB 1 information.

The SIB 1 information includes two parameters of cellReservedForOperatorUse and cellReservedForOtherUse. The two parameters of cellReservedForOperatorUse and cellReservedForOtherUse and the cellBarred in the MIB information may commonly be used for determining an access control status of a cell, or may be used by the UE to determine whether the IAB base station may be accessed. At present, the cellReservedForOperatorUse, cellReservedForOtherUse and cellBarred are defined as: when cellBarred="not barred", cellReservedForOperatorUse="not reserved", and cellReservedForOtherUse=not "true", the cell status is that access of the UE is allowable, that is, the UE may use the cell as a candidate cell for cell selection or reselection; when cellBarred="barred" or cellReservedForOtherUse="true", the cell status is that the access of the UE is not allowable; and when cellBarred="not barred", cellReservedForOperatorUse="reserved", and cellReservedForOtherUse=not "true", the cell status is that access of some access types of UEs is allowable.

In addition, the present disclosure scenario involved in the embodiments of the present disclosure is briefly described.

An IAB base station refers to a base station that provides a user with radio access, which usually needs a backhaul link to be connected to a core network or other IAB base stations for data backhaul. That is, the IAB base station may support UE to access, and may also support other IAB base stations to access. In general, in consideration of complexity and flexibility of deployment, most of the backhaul links between the IAB base station and other IAB base stations adopt radio backhaul, such as microwave backhaul. As a speed of 5G deployment accelerates, network capacity, complexity, and delay requirements are gradually increasing, and the number of mobile base stations is gradually increasing. Therefore, an application range of the radio backhaul is gradually expanding, making the IAB base station easier to be deployed in dense and complex scenarios, and reducing burden of deploying wired transmission networks.

For the radio backhaul, there is currently no technical record on how to implement access control for other IAB base stations. In some scenarios, it is often necessary to control the access of other IAB base stations and the access of the UE, respectively. For example, it may be necessary that only the access of the IAB base station is allowable. Therefore, in order to improve flexibility of IAB base station access control, the embodiments of the present disclosure provide an information indication method, and the information indication method may individually control the access of the IAB base station, that is, the access control of the IAB base station is separated from that of the UE, which improves the flexibility of access control of the IAB base station. A specific implementation thereof will be described with reference to the following embodiments.

Next, the implementation environment involved in the embodiments of the present disclosure will be briefly introduced.

FIG. 1 is a schematic diagram showing an implementation environment according to an exemplary embodiment, and referring to FIG. 1, the implementation environment includes multiple IAB base stations 110 and UEs 120. Each IAB base station 110 can perform data communication with the served UE 120 through a radio access link, and the multiple IAB base stations 110 can perform the data backhaul through a radio backhaul link.

For ease of description and understanding, an IAB base station of the multiple IAB base stations 110 that provides a radio backhaul function to other IAB base stations is referred to as a first IAB base station, and the other IAB base stations wirelessly connected to the first IAB base station are referred to as a second IAB base station.

After describing the terms, application scenario, and implementation environment provided by the embodiments of the present disclosure, the information indication method provided by the embodiments of the present disclosure will be described in detail in conjunction with the drawings.

Figure 2:
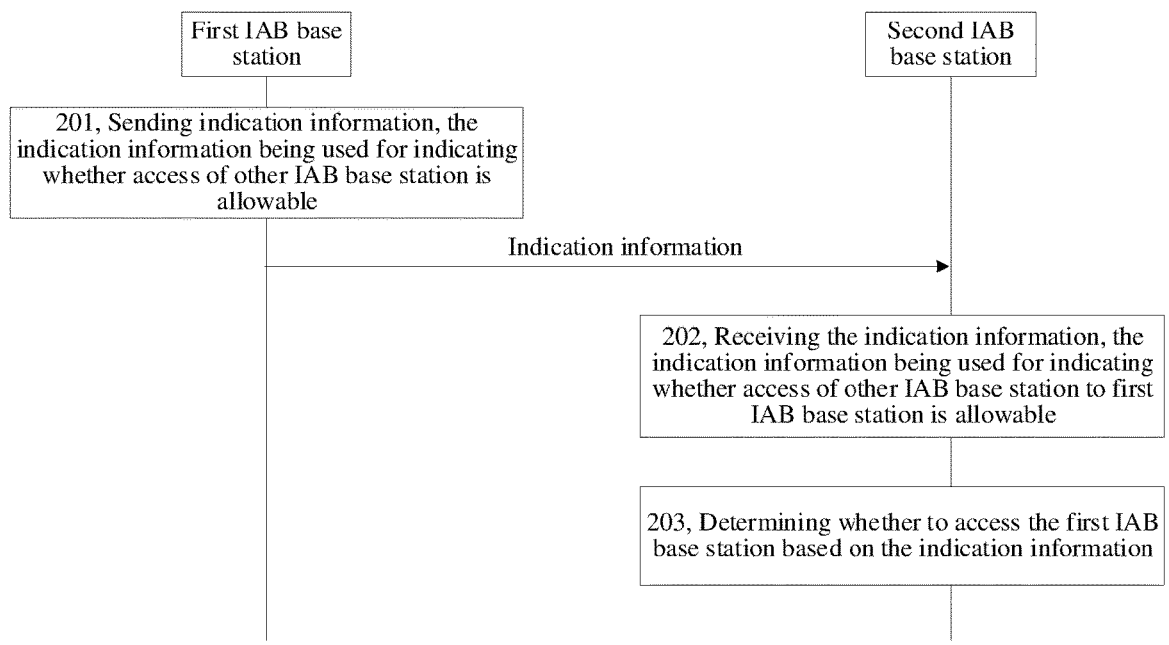
FIG. 2 is a flowchart showing an information indication method according to an exemplary embodiment.

FIG. 2 is a flowchart showing an information indication method according to an exemplary embodiment. With reference to FIG. 2, the information indication method may include the following implementation steps.

In step 201, a first IAB base station sends indication information, wherein the indication information is used for indicating whether access of another IAB base station is allowable.

Specifically, sending, by the first IAB base station, the indication information may include sending, by the first IAB base station, at least one of system information and broadcast information, wherein the at least one of the system information and the broadcast information includes the indication information.

That is, the first IAB base station may carry the indication information through at least one of the system information and the broadcast information. In other words, the first IAB base station may carry the indication information only through the system information, or may carry the indication information only through the broadcast information, or may carry the indication information through the system information and the broadcast information.

The system information may be SIB 1 information. In addition, the broadcast information may be information carried by a PBCH channel.

Further, sending, by the first IAB base station, the indication information may include broadcasting, by the first IAB base station, the indication information. That is, the first IAB base station may send the indication information in a broadcast manner, so that the other IAB base station that can listen to the indication information may determine whether to access the first IAB base station according to the indication information.

In step 202, a second IAB base station receives the indication information, wherein the indication information is used for indicating whether access of another IAB base station is allowable.

Further, a specific implementation of the second IAB base station receiving the indication information may include receiving at least one of system information and broadcast information, wherein the at least one of the system information and the broadcast information includes the indication information.

Specifically, when the first IAB base station carries the indication information through the system information, the second IAB base station receives the system information. Or, when the first IAB base station carries the indication information through the broadcast information, the second IAB base station receives the broadcast information. Or, when the first IAB base station carries the indication information through the system information and the broadcast information, the second IAB base station receives the system information and the broadcast information.

In a possible implementation, when the first IAB base station sends the indication information in a broadcast manner, the second IAB base station may periodically listen to the indication information to receive the indication information. That is, the indication information broadcast by the first IAB base station can be listened to every reference duration. The reference duration may be set according to actual needs, which is not limited in the embodiment of the present disclosure.

In step 203, the second IAB base station determines whether to access the first IAB base station based on the indication information.

Specifically, when the indication information indicates that the access of the other IAB base station to the first IAB base station is allowable, the second IAB base station determines that the first IAB base station may be accessed; otherwise, when the indication information indicates that the access of the other IAB base station to the first IAB base station is not allowable, the second IAB base station determines that the first IAB base station may not be accessed.

In the embodiments of the present disclosure the first IAB base station sends the indication information. Since the indication information is used for indicating whether the access of the other IAB base station to the first IAB base station is allowable, the second IAB base station may determine whether to access the first IAB base station after receiving the indication information. In this way, the access of the other IAB base stations are individually controlled through the indication information, that is, the access control of the other IAB base station is separated from that of the UE, which improves the flexibility of access control of the IAB base station.

According to the embodiment shown in FIG. 2, it can be seen that the first IAB base station sends at least one of the system information and the broadcast information to carry the indication information through the at least one of the system information and the broadcast information, which means that the first IAB base station may carry the indication information only through the system information, or may carry the indication information only through the broadcast information, or may carry the indication information through the system information and the broadcast information. According to different implementations, the following specific examples will be described respectively.

Figure 3:
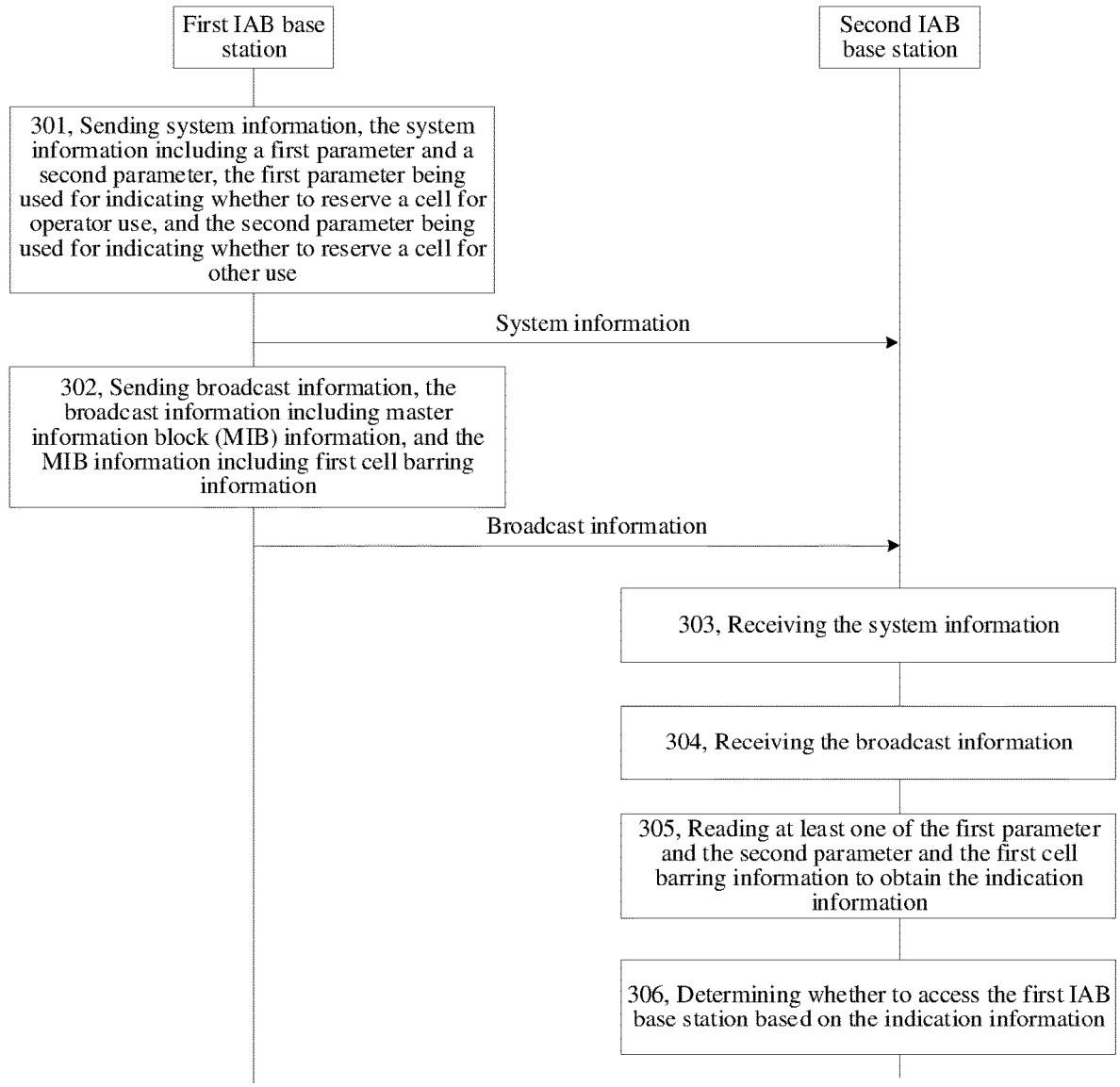
FIG. 3 is a flowchart showing an information indication method according to another exemplary embodiment.

FIG. 3 is a flowchart showing an information indication method according to an exemplary embodiment. With reference to FIG. 3, the information indication method may include the following steps.

in step 301, the first IAB base station sends the system information, wherein the system information includes a first parameter and a second parameter, the first parameter is used for indicating whether to reserve a cell for operator use, and the second parameter is used for indicating whether to reserve a cell for other use.

Further, the first IAB base station broadcasts the indication information, that is, the indication information may be sent in the broadcast manner. In some embodiments, the system information may be the SIB 1 information. In this case, the first parameter may be cellReservedForOperatorUse, and the second parameter may be cellReservedForOtherUse.

In step 302, the first IAB base station sends the broadcast information, wherein the broadcast information includes master information block (MIB) information, and the MIB information includes first cell barring information.

Further, the first IAB base station broadcasts the broadcast information, that is, the first IAB base station may send the broadcast information in the broadcast manner.

It should be noted that there is no certain execution order between the step 302 and the step 301, that is, the first IAB base station may send the system information and the broadcast information separately at different times, or may send the system information and the broadcast information at the same time, which is not limited by the embodiments of the present disclosure.

In a possible implementation, the first cell barring information may be cellbarred, which is used for indicating an access control status of the cell.

At least one of the first parameter and the second parameter and the first cell barring information constitute the indication information. Further, when content of the at least one of the first parameter and the second parameter and content of the first cell barring information satisfy a first reference condition, the indication information is used for indicating that the access of the other IAB base station is allowable; and when the content of the at least one of the first parameter and the second parameter and the content of the first cell barring information do not satisfy the first reference condition, the indication information is used for indicating that the access of the other IAB base station is not allowable.

Further, at least one of the cellReservedForOperatorUse and cellReservedForOtherUse and the cellbarred may be used to form the indication information, and in the implementation, it may be indicated whether the access of the other IAB base station is allowable according to whether the content of the at least one of cellReservedForOperatorUse and cellReservedForOtherUse and the content of cellbarred satisfy the first reference condition. As mentioned above, since the three parameters cellbarred, cellReservedForOperatorUse, and cellReservedForOtherUse currently may be used for indicating whether access of UE to the IAB base station is allowable, in order not to affect the access control of the UE, in a possible implementation, the first reference condition may include at least one of the following situations: a first situation: the first cell barring information indicates that access to the first IAB base station is barred, and the second parameter indicates to reserve the cell for other use; a second situation: the first cell barring information indicates that access to the first IAB base station is barred, and the first parameter indicates to reserve the cell for operator use; a third situation: the first cell barring information indicates that access to the first IAB base station is barred, and the first parameter indicates to reserve the cell for operator use, and the second parameter indicates to reserve the cell for other use; a fourth situation: the first cell barring information indicates that access to the first IAB base station is barred, and the first parameter indicates to reserve the cell for operator use, or the second parameter indicates to reserve the cell for other use; a fifth situation: the first cell barring information indicates that access to the first IAB base station is not barred, and the first parameter indicates to reserve the cell for operator use, and the second parameter indicates to reserve the cell for other use; and a sixth situation where the first cell barring information indicates that access to the first IAB base station is not barred, and the second parameter indicates to reserve the cell for other use.

That is to say, when the content of at least one of the first parameter and the second parameter and the content of the first cell barring information satisfy at least one of the above six situations, the indication information is used for indicating that the access of the other IAB base station is allowable. Otherwise, when the content of at least one of the first parameter and the second parameter and the content of the first cell barring information do not satisfy the above six situations, the indication information is used for indicating that the access of the other IAB base station is not allowable.

For example, when cellBarred="barred" and cellReservedForOtherUse="true", the indication information is used for indicating that the access of the other IAB base station is allowable. When cellBarred="barred" and cellReservedForOperatorUse="reserved", the indication information is used for indicating that the access of the other IAB base station is allowable. When cellBarred="barred" and cellReservedForOperatorUse="reserved", the indication information is used for indicating that the access of the other IAB base station is allowable. When cellBarred="barred", and (cellReservedForOperatorUse="reserved" or cellReservedForOtherUse="true"), the indication information is used for indicating that the access of the other IAB base station is allowable. When cellBarred="not barred", cellReservedForOperatorUse="reserved", cellReservedForOtherUse="true", the indication information is used for indicating that the access of the other IAB base station is allowable. When cellBarred="not barred" and cellReservedForOtherUse="true"), the indication information is used for indicating that the access of the other IAB base station is allowable. Otherwise, the indication information is used for indicating that the access of the other IAB base station is not allowable.

It should be noted that the embodiment does not need to add new information additionally, but uses the parameters cellBarred, cellReservedForOtherUse, and cellReservedForOperatorUse that have been used in the communication technologies related to the cell status to form the indication information, that is, uses an undefined combination form to indicate whether the access of the other IAB base station is allowable. The independent control of the IAB base station is realized without affecting the access control of the UE, which and downward compatibility with the existing communication system is ensured.

It should be noted that the above description is only based on an example that the first reference condition includes at least one of the above several situations, that is, it only takes an example in which the indication information is used for indicating that the access of the other IAB base station is allowable when at least one of the first parameter and the second parameter and the first cell barring information satisfy at least one of the above several situations. In another embodiment, at least one of the above several situations may also be used for indicating that the access of the other IAB base station is not allowable, that is, in a specific implementation scenario, the above several situations may be set according to actual needs to indicate whether the access of the other IAB base station is allowable, which is not limited in the embodiments of the present disclosure.

In addition, in some embodiments, when the content of at least one of the first parameter and the second parameter and the content of the first cell barring information satisfy at least one of the following two situations, the indication information is used for indicating that the access of the other IAB base station is allowable, where the two situations include: 1. cellBarred="not barred", cellReservedForOperatorUse="not reserved", and cellReservedForOtherUse=not "true"; 2. cellBarred="not barred", cellReservedForOperatorUse="reserved", and cellReservedForOtherUse=not "true". That is to say, generally, when the IAB base station allows the UE to access or allows some access types of UEs to access, the access of the other IAB base stations is also allowed by default.

It should also be noted that at least one of the situations included in the first reference condition is only exemplary. In the implementation, other combinations may be used to indicate whether the access of the other IAB base station is allowable without affecting the access of the UE.

In step 303, the second IAB base station receives the system information.

In a possible implementation, when the first IAB base station sends the broadcast information in a broadcast manner, the second IAB base station may receive the broadcast information in a manner in which periodical listening is performed. That is, the system information broadcast by the first IAB base station can be listened to every reference duration. The reference duration may be set according to actual needs.

In step 304, the second IAB base station receives the broadcast information.

Similarly, when the first IAB base station sends the broadcast information in a broadcast manner, the second IAB base station may receive the broadcast information in a manner in which periodical listening is performed. That is, the broadcast information broadcast by the first IAB base station can be listened to every reference duration.

Similarly, there is no certain execution order between the step 303 and the step 304, that is, the second IAB base station may receive the system information and the broadcast information respectively at different times, or may receive the system information and the broadcast information at the same time, which is not limited by the embodiments of the present disclosure.

In step 305, the second IAB base station reads the at least one of the first parameter and the second parameter and the first cell barring information to obtain the indication information.

When the first IAB base station uses the first parameter and the first cell barring information to form the indication information, the second IAB base station reads the first parameter and the first cell barring information. When the second parameter and the first cell barring information are used to form the indication information, the second IAB base station reads the second parameter and the first cell barring information. When the first parameter, the second parameter, and the first cell barring information are used to form the indication information, the second IAB base station reads the first parameter, the second parameter, and the first cell barring information.

In step 306, the second IAB base station determines whether to access the first IAB base station based on the indication information.

Specifically, when the indication information indicates that the access of the other IAB base station to the first IAB base station is allowable, the second IAB base station determines that the first IAB base station may be accessed; otherwise, when the indication information indicates that the access of the other IAB base station to the first IAB base station is not allowable, the second IAB base station determines that the first IAB base station may not be accessed.

For example, when the indication information includes cellBarred and cellReservedForOtherUse, and the cellBarred="barred" and cellReservedForOtherUse="true", the second IAB base station determines that it can access the first IAB base station.

In the embodiments of the present disclosure, the first IAB base station sends the indication information. Since the indication information is used for indicating whether the access of the other IAB base station to the first IAB base station is allowable, the second IAB base station may determine whether to access the first IAB base station after receiving the indication information. In this way, the access of the other IAB base station are individually controlled through the indication information, that is, the access control of the other IAB base station is separated from that of the UE, which improves the flexibility of access control of the IAB base station.

Figure 4:
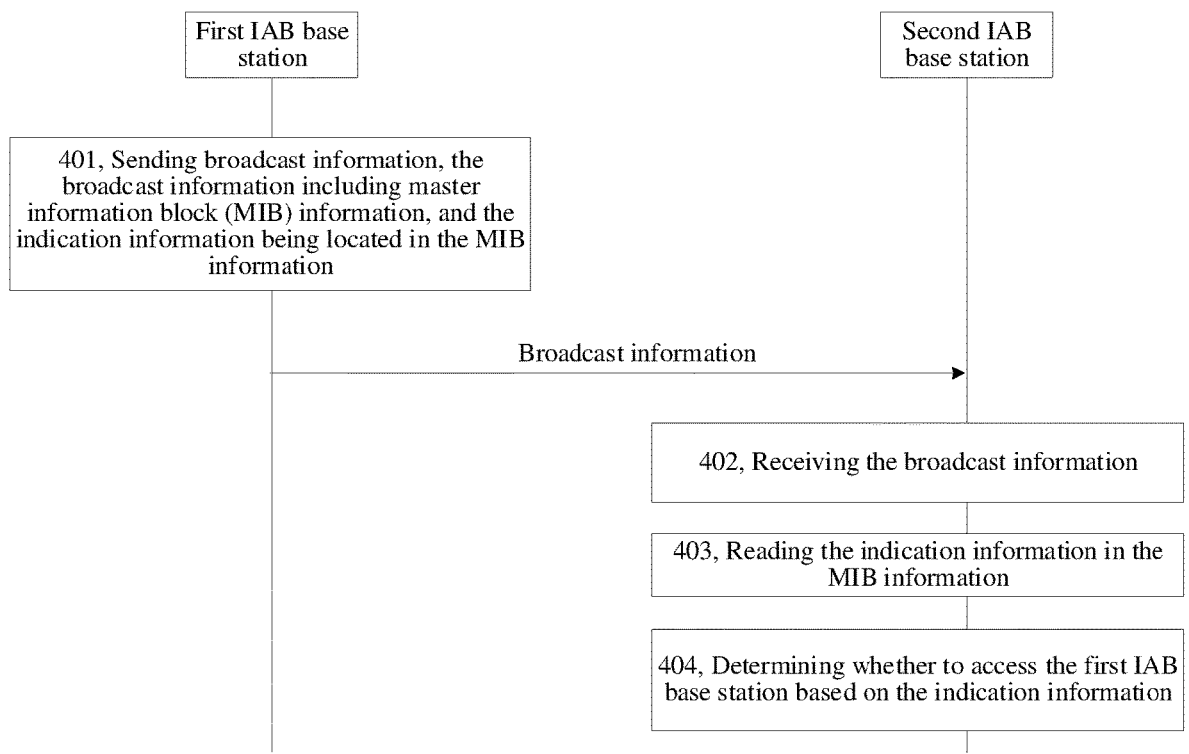
FIG. 4 is a flowchart showing an information indication method according to another exemplary embodiment.

FIG. 4 is a flowchart showing an information indication method according to another exemplary embodiment. With reference to FIG. 4, the information indication method may include the following implementation steps.

In step 401, a first IAB base station sends broadcast information, wherein the broadcast information includes master information block (MIB) information, and the indication information is located in the MIB information.

In a possible implementation, the indication information is located in an idle bit of the MIB information. As mentioned above, the MIB information includes a 1-bit idle bit. Therefore, the indication information may be added to the idle bit.

For example, the indication information can be expressed as cellBarred-IAB. When cellBarred-IAB="not barred", it is used to indicate that access of another IAB base station is allowable, and when cellBarred-IAB="barred", it is used to indicate that the access of the other IAB base station is not allowable.

Further, the indication information may be defined in a standard as: cellBarred-IAB ENUMERATED {barred, notBarred}.

It should be noted that the use of idle bit in the MIB information to carry the indication information to achieve individual control of the IAB base station may reduce the impact on the information used in the communication technologies.

The foregoing implementation is only exemplary. In another embodiment, other information in the MIB information may also be used as the indication information, which is not limited in the embodiments of the present disclosure.

In step 402, a second IAB base station receives the broadcast information.

In a possible implementation, when the first IAB base station sends the broadcast information in a broadcast manner, the second IAB base station may receive the broadcast information in a manner in which periodical listening is performed. That is, the system information broadcast by the first IAB base station can be listened to every reference duration. The reference duration may be set according to actual needs.

In step 403, the second IAB base station reads the indication information in the MIB information.

In some embodiments, when the first IAB base station uses the idle bit in the MIB information to carry the indication information, the second IAB base station may read the indication information from the idle bit in the MIB information. For example, the read indication information is cellBarred-IAB.

In step 404, the second IAB base station determines whether to access the first IAB base station based on the indication information.

Specifically, when the indication information indicates that the access of the other IAB base station to the first IAB base station is allowable, the second IAB base station determines that the first IAB base station may be accessed; otherwise, when the indication information indicates that the access of the other IAB base station to the first IAB base station is not allowable, the second IAB base station determines that the first IAB base station may not be accessed.

For example, when the cellBarred-IAB="not barred", it is determined that the first IAB base station may be accessed, and when the cellBarred-IAB="barred", it is determined that the first IAB base station may not be accessed.

In the embodiments of the present disclosure, the first IAB base station sends the indication information. Since the indication information is used for indicating whether the access of the other IAB base station to the first IAB base station is allowable, the second IAB base station may determine whether to access the first IAB base station after receiving the indication information. In this way, the access of the other IAB base station is individually controlled through the indication information, that is, the access control of the other IAB base station is separated from that of the UE, which improves the flexibility of access control of the IAB base station.

Figure 5:
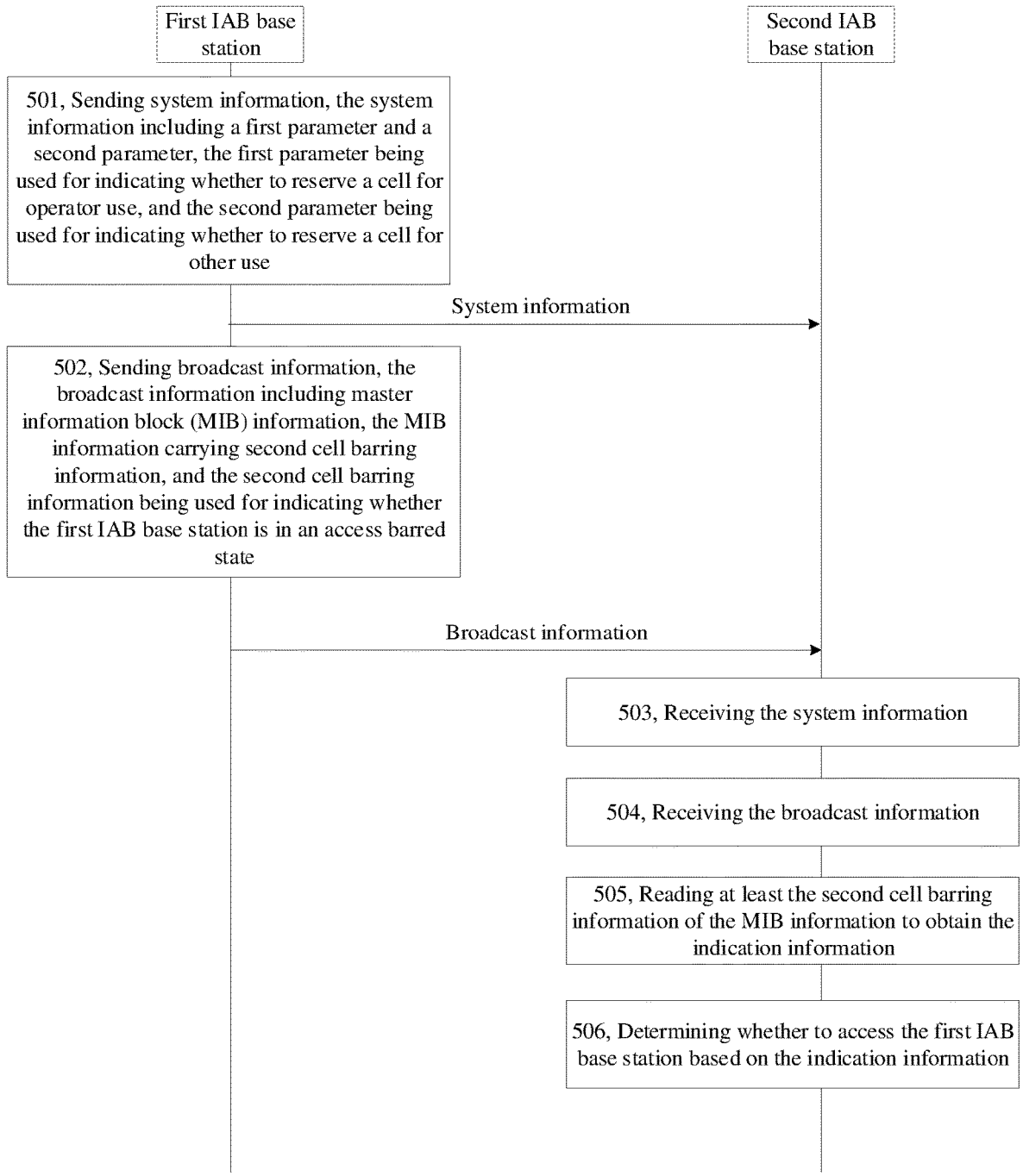
FIG. 5 is a flowchart showing an information indication method according to another exemplary embodiment.

FIG. 5 is a flowchart showing an information indication method according to another exemplary embodiment. With reference to FIG. 5, the information indication method may include the following implementation steps.

In step 501, a first IAB base station sends system information, wherein the system information includes a first parameter and a second parameter, and the first parameter is used for indicating whether to reserve a cell for operator use, and the second parameter is used for indicating whether to reserve a cell for other use.

Further, the first IAB base station broadcasts the system information, that is, the first IAB base station may send the system information in a broadcast manner. The system information may be SIB 1 information. In this case, the first parameter may be cellReservedForOperatorUse, and the second parameter may be cellReservedForOtherUse.

In step 502, the first IAB base station sends broadcast information, wherein the broadcast information includes master information block (MIB) information, the MIB information carries second cell barring information, and the second cell barring information is used for indicating whether the first IAB base station is in an access barred status.

Further, the first IAB base station broadcasts the broadcast information, that is, the first IAB base station may send the broadcast information in the broadcast manner.

It should be noted that there is no certain execution order between the step 502 and the step 501, that is, the first IAB base station may send the system information and the broadcast information separately at different times, or may send the system information and the broadcast information at the same time, which is not limited by the embodiments of the present disclosure.

Further, the second cell barring information may be located in an idle bit of the MIB information, that is, the first IAB base station may add the second cell barring information to the idle bit of the MIB information to indicate whether the first IAB base station is in the access barred status. For example, the second cell barred information may be expressed as cellBarred-IAB. Further, when the cellBarred-IAB="not barred", it is used to indicate that the first IAB base station is in an access non-barred status, and when the cellBarred-IAB="barred", it is used to indicate that the first IAB base station is in the access barred status.

At least one of the first parameter and the second parameter and the second cell barring information of the MIB information constitute the indication information. When the second cell barring information indicates that the first IAB base station is in the access barred status, the indication information indicates that the access of the other IAB base station is not allowable. When the second cell barring information indicates that the first IAB base station is in the access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

That is, when the second cell barring information indicates that the first IAB base station is in the access barred status, the indication information may indicate that the access of the other IAB base station is not allowable; when the second cell barring information indicates that the first IAB base station is in the access non-barred status, at least one of the first parameter and the second parameter may further be combined to indicate whether the access of the other IAB base station is allowable. Specifically, the indication may be performed according to whether the content of at least one of the first parameter and the second parameter satisfies the second reference condition.

The second reference condition may be set according to actual needs. In a possible implementation, the first reference condition may include at least one of the following situations: a first situation: the first parameter indicates not to reserve the cell for operator use, and the second parameter indicates not to reserve the cell for other use; and a second situation: the first parameter indicates to reserve the cell for operator use.

That is, when the second cell barring information indicates that the first IAB base station is in the access non-barred status, and the content of at least one of the first parameter and the second parameter satisfies at least one of the above two situations, the indication information is used for indicating that the access of the other IAB base station is allowable; otherwise, the indication information is used to indicate that the access of the other IAB base station is not allowable.

For example, it is assumed that the second cell barred information is expressed as cellBarred-IAB, the first parameter is cellReservedForOperatorUse, and the second parameter is cellReservedForOtherUse. Then when cellBarred-IAB="not barred", cellReservedForOperatorUse="not reserved", and cellReservedForOtherUse=not "true", the indication information is used to indicate that the access of the other IAB base station is allowable. When cellBarred-IAB="not barred" and cellReservedForOperatorUse="reserved", the indication information may also be used to indicate that the access of the other IAB base station is allowable. Otherwise, for other situations, the indication information is used to indicate that the access of the other IAB base station is not allowable.

It should be noted that, the indication information is constituted based on the second cell barring information in conjunction with at least one of the first parameter and the second parameter, which is compatible with the current existing communication technologies and thus reduces the computational cost.

In step 503, the second IAB base station receives the system information.

In a possible implementation, when the first IAB base station sends the system information in a broadcast manner, the second IAB base station may receive the system information in a manner in which periodical listening is performed. That is, the system information broadcast by the first IAB base station can be listened to every reference duration. The reference duration may be set according to actual needs.

In step 504, the second IAB base station receives the broadcast information.

Similarly, when the first IAB base station sends the broadcast information in a broadcast manner, the second IAB base station may receive the broadcast information in a manner in which periodical listening is performed. That is, the broadcast information broadcast by the first IAB base station can be listened to every reference duration. The reference duration may be set according to actual needs.

Similarly, there is no certain execution order between the step 503 and the step 504, that is, the second IAB base station may receive the system information and the broadcast information separately at different times, or may receive the system information and the broadcast information at the same time, which is not limited by the embodiments of the present disclosure.

In step 505, the second IAB base station reads at least the second cell barring information of the MIB information to obtain the indication information.

Specifically, the second IAB base station reads the second cell barring information of the MIB information to obtain the indication information. When the second cell barring information indicates that the first IAB base station is in the access barred status, it is determined that the indication information indicates that the access of the other IAB base station is not allowable; when the second cell barring information indicates that the first IAB base station is in the access non-barred status, at least one of the first parameter and the second parameter is continued to be read to obtain the indication information.

When the second cell barring information indicates that the first IAB base station is in the access barred status, it may be directly determined that the indication information indicates that the access of the other IAB base station is not allowable, that is, there is no need to read the two parameters in the system information, and when the second cell barring information indicates that the first IAB base station is in the access non-barred status, it needs to continue to read the first parameter and the second parameter in the system information, therefore, the second IAB base station at least reads the second cell barring information of the MIB information, that is, the second cell barring information must be read. As to whether it is necessary to read at least one of the first parameter and the second parameter, it needs to be determined according to the indication information of the second cell information.

It should be noted that when the second cell barring information indicates that the first TAB base station is in the access barred status, only the second cell barring information needs to be read to determine whether the first TAB allows the other TAB to access. In this way, the number of readings is reduced, and the power consumption of the base station is reduced.

In step 506, the second TAB base station determines whether to access the first TAB base station based on the indication information.

Specifically, when the indication information indicates that the access of the other TAB base station to the first TAB base station is allowable, the second TAB base station determines that the first TAB base station may be accessed; otherwise, when the indication information indicates that the access of the other TAB base station to the first TAB base station is not allowable, the second TAB base station determines that the first TAB base station may not be accessed.

For example, when the indication information includes the second cell barring information cellBarred-IAB, the first parameter cellReservedForOperatorUse, and the second parameter cellReservedForOtherUse, if cellBarred-IAB="not barred", cellReservedForOperatorUse="not reserved" and cellReservedForOtherUse=not "True", it is determined that the first TAB base station may be accessed.

In the embodiments of the present disclosure, the first TAB base station sends the indication information. Since the indication information is used for indicating whether access of the other TAB base station to the first TAB base station is allowable, the second TAB base station may determine whether to access the first TAB base station after receiving the indication information. In this way, the access of the other TAB base station is individually controlled through the indication information, that is, the access control of the other TAB base station is separated from that of the UE, which improves the flexibility of access control of the TAB base station.

Figure 6:
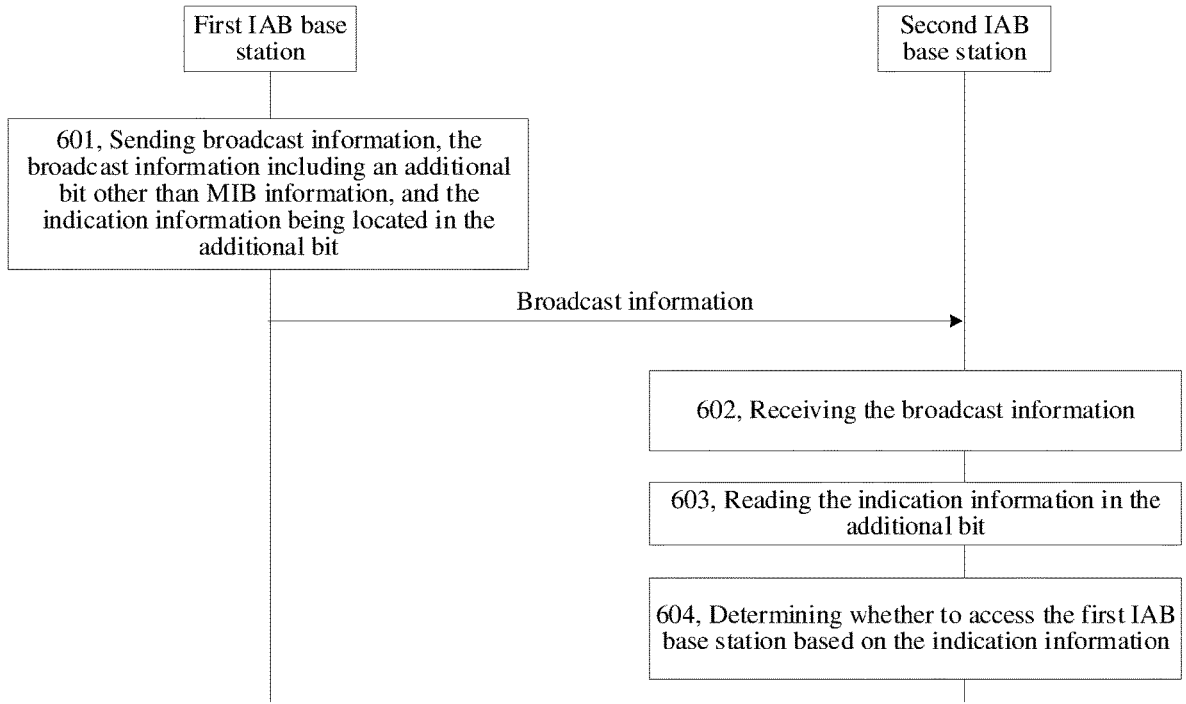
FIG. 6 is a flowchart showing an information indication method according to another exemplary embodiment.

FIG. 6 is a flowchart showing an information indication method according to another exemplary embodiment. With reference to FIG. 6, the information indication method may include the following implementation steps.

In step 601, a first TAB base station sends broadcast information, wherein the broadcast information includes an additional bit other than MIB information, and the indication information is located in the additional bit.

In a possible implementation, a specific implementation of the first IAB base station sending the broadcast information may include that the first IAB base station broadcasts the broadcast information. In other words, the first IAB base station may send the broadcast information in a broadcast manner.

In some embodiments, the indication information is located in the information carried by the PBCH channel. The additional bits are bits where 8-bit information of layer 1 of the PBCH channel is located, and correspondingly, the indication information is located in the 8-bit information of layer 1 carried by the PBCH channel.

Further, when a system frequency band bandwidth of the first IAB base station is less than a reference frequency band threshold, the indication information may be located in a reserved bit of the additional bits. As described above, since when the system frequency band bandwidth of the first IAB base station is less than the reference frequency band threshold, the additional bits include two reserved bits. Therefore, the indication information may be added to the reserved bits.

For example, the indication information may be expressed as cellBarred-IAB. In a possible implementation, when cellBarred-IAB="not barred", it is used to indicate that the access of the other IAB base station is allowable, and when cellBarred-IAB="barred", it is used to indicate that the access of the other IAB base station is not allowable.

Further, it may be defined in a standard as: cellBarred-IAB ENUMERATED {barred, notBarred}.

The above-mentioned reference frequency band threshold may be set according to actual requirements. For example, the reference frequency band threshold may be 6 GHz and so on.

It should be noted that the use of idle bit in the additional bits to carry indication information to achieve individual control of the IAB base station may reduce the impact on the information used by the communication technologies.

It should be noted that the above description is based on adding the indication information in the reserved bits as an example. In another embodiment, the information on the additional bits that has been used by the communication technologies may also be used as the indication information, which is not limited by the embodiments of the present disclosure.

In step 602, the second IAB base station receives the broadcast information.

In a possible implementation, when the first IAB base station sends the broadcast information in a broadcast manner, the second IAB base station may receive the broadcast information in a manner in which periodical listening is performed. That is, the system information broadcast by the first IAB base station can be listened to every reference duration. The reference duration may be set according to actual needs.

In step 603, the second IAB base station reads the indication information in the additional bit.

Further, when the first IAB base station uses the reserved bit of the additional bits to carry the indication information, the second IAB base station may read the indication information from the reserved bit of the additional bits. For example, the read indication information is cellBarred-IAB.

In step 604, the second IAB base station determines whether to access the first IAB base station based on the indication information.

Specifically, when the indication information indicates that the access of the other IAB base station to the first IAB base station is allowable, the second IAB base station determines that the first IAB base station may be accessed; otherwise, when the indication information indicates that the access of the other IAB base station to the first IAB base station is not allowable, the second IAB base station determines that the first IAB base station may not be accessed.

For example, when the cellBarred-IAB="not barred", it is determined that the first IAB base station may be accessed, and when the cellBarred-IAB="barred", it is determined that the first IAB base station may not be accessed.

In the embodiments of the present disclosure, the first IAB base station sends the indication information. Since the indication information is used for indicating whether the access of the other IAB base station to the first IAB base station is allowable, the second IAB base station may determine whether to access the first IAB base station after receiving the indication information. In this way, the access of the other IAB base station is individually controlled through the indication information, that is, the access control of the other IAB base station is separated from that of the UE, which improves the flexibility of access control of the IAB base station.

It should be noted that the embodiment shown in FIG. 6 is described by taking that the indication information is carried by the additional bit carried by the PBCH as an example. In another embodiment, the first IAB base station may also add third cell barring information in the additional bit carried by the PBCH, and combines the same and the first and second parameters as the indication information. In the implementation, the first IAB base station sends the system information and sends the broadcast information. The additional bit of the broadcast information include the third cell barring information, at least one of the first parameter and the second parameter in the system information, and the third cell barring information constitutes the indication information. At this time, when the third cell barring information indicates that the first IAB base station is in the access barred status, the indication information indicates that the access of the other IAB base station is not allowable. Otherwise, when the third cell barring information indicates that the first IAB base station is in the access non-barred status, at least one of the first parameter and the second parameter may be combined to indicate whether the access of the other IAB base station is allowable. The specific implementation thereof is similar to that in the embodiment in FIG. 5 in which at least one of the first parameter and the second parameter and the second cell barring information are used to indicate whether the access of the other IAB base station is allowable.

Correspondingly, the second IAB receives the system information and the broadcast information, and reads at least the third cell barring information in the MIB information to obtain the indication information. Specifically, the second IAB base station reads the third cell barring information of the MIB information, and when the third cell barring information indicates that the first IAB base station is in the access barred status, it is determined that the indication information indicates that the access of the other IAB base station is not allowable; and when the third cell barring information indicates that the first IAB base station is in the access non-barred status, at least one of the first parameter and the second parameter is continued to be read to obtain the indication information, that is, at least one of the first parameter and the second parameter is combined to determine whether the first IAB base station allows the other IAB base station to access.

In addition, it should be noted that in the above-mentioned embodiments, the information used in the communication technologies is used to carry the indication information. In another embodiment, a new high-level signaling may be defined to indicate whether the access of the other IAB base station is allowable. For example, the defined new high-level signaling may be carried in information such as SIB 1, and further, the parameters cellBarredForIAB, cellReservedForOperatorUseForIAB, and cellReservedForOtherUseForIAB may be introduced, so that the indication information is formed through these three parameters. The cellBarredForIAB may be used for indicating the access control status of the cell, the cellReservedForOperatorUseForIAB may be used for indicating whether to reserve a cell for operator use, and the cellReservedForOtherUseForIAB may be used for indicating whether to reserve a cell for other uses.

It should be noted that the reference duration in the foregoing various embodiments may be the same or different, which is not limited in the embodiments of the present disclosure. In each of the foregoing embodiments, although the indication information is added to indicate whether the access of the other IAB base station is allowable, the indication information does not affect the access of the UE, thereby ensuring separate control of the access of the other TAB base station and the access of the UE to achieve downward compatibility with the existing communication system.

Figure 7:
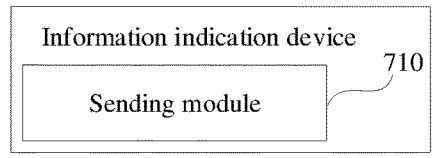
FIG. 7 is a schematic structural diagram showing an information indication device according to an exemplary embodiment.

FIG. 7 is a schematic structural diagram showing an information indication device according to an exemplary embodiment. The information indication device is configured in a first IAB base station. The information indication device may include a sending module 710, configured to send indication information.

The indication information is used for indicating whether access of another TAB base station is allowable.

Optionally, the sending module 710 is configured to send at least one of system information and broadcast information, wherein the at least one of the system information and the broadcast information includes the indication information.

Optionally, the sending module 710 is configured to send the system information, wherein the system information includes a first parameter and a second parameter, the first parameter is used for indicating whether to reserve a cell for operator use, and the second parameter is used for indicating whether to reserve a cell for other use; and send the broadcast information, wherein the broadcast information includes master information block (MIB) information, and the MIB information includes first cell barring information.

At least one of the first parameter and the second parameter and the first cell barring information constitute the indication information.

Optionally, when content of the at least one of the first parameter and the second parameter and content of the first cell barring information satisfy a first reference condition, the indication information is used for indicating that the access of the other IAB base station is allowable; and when the content of the at least one of the first parameter and the second parameter and the content of the first cell barring information do not satisfy the first reference condition, the indication information is used for indicating that the access of the other IAB base station is not allowable.

Optionally, the first reference condition includes at least one of the followings: the first cell barring information indicates that access to the first IAB base station is barred, and the second parameter indicates to reserve the cell for other use; the first cell barring information indicates that access to the first IAB base station is barred, and the first parameter indicates to reserve the cell for operator use; the first cell barring information indicates that access to the first IAB base station is barred, and the first parameter indicates to reserve the cell for operator use, and the second parameter indicates to reserve the cell for other use; the first cell barring information indicates that access to the first IAB base station is barred, and the first parameter indicates to reserve the cell for operator use, or the second parameter indicates to reserve the cell for other use; the first cell barring information indicates that access to the first IAB base station is not barred, and the first parameter indicates to reserve the cell for operator use, and the second parameter indicates to reserve the cell for other use; and the first cell barring information indicates that access to the first IAB base station is not barred, and the second parameter indicates to reserve the cell for other use.

Optionally, the sending module 710 is configured to send the broadcast information, wherein the broadcast information includes master information block (MIB) information, and the indication information is located in the MIB information.

Optionally, the sending module 710 is configured to send the system information, wherein the system information includes a first parameter and a second parameter, the first parameter is used for indicating whether to reserve a cell for operator use, and the second parameter is used for indicating whether to reserve a cell for other use; and send the broadcast information, wherein the broadcast information includes master information block (MIB) information, the MIB information carries second cell barring information, and the second cell barring information is used for indicating whether the first IAB base station is in an access barred status.

At least one of the first parameter and the second parameter and the second cell barring information of the MIB information constitute the indication information.

Optionally, when the second cell barring information indicates that the first IAB base station is in the access barred status, the indication information indicates that the access of the other IAB base station is not allowable; when the second cell barring information indicates that the first IAB base station is in an access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

Optionally, the second reference condition includes at least one of the followings: the first parameter indicates not to reserve the cell for operator use, and the second parameter indicates not to reserve the cell for other use; and the first parameter indicates to reserve the cell for operator use.

Optionally, the sending module 710 is configured to send the broadcast information, wherein the broadcast information includes an additional bit other than MIB information, and the indication information is located in the additional bit.

Optionally, the system information is system information block (SIB) 1 information.

Optionally, the sending module 710 is configured to broadcast the indication information.

In the embodiments of the present disclosure, the first IAB base station sends the indication information. Since the indication information is used for indicating the access of the other IAB base station to the first IAB base station is allowable, the second IAB base station may determine whether to access the first IAB base station after receiving the indication information. In this way, the access of the other IAB base station is individually controlled through the indication information, that is, the access control of the other IAB base station is separated from that of the UE, which improves the flexibility of access control of the IAB base station.

Figure 8:
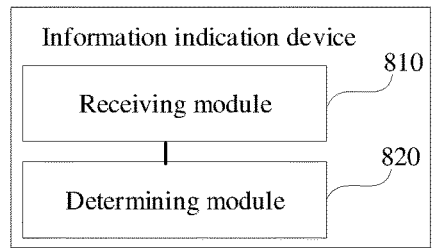
FIG. 8 is a schematic structural diagram showing an information indication device according to another exemplary embodiment.

FIG. 8 is a schematic structural diagram showing an information indication device according to an exemplary embodiment. The information indication device may be configured in a second IAB base station. The information indication device may include a receiving module 810, configured to receive indication information, wherein the indication information is used for indicating whether access of another IAB base station to the first IAB base station is allowable; and a determining module 820, configured to determine whether to access a first IAB base station based on the indication information.

Optionally, the receiving module 810 is configured to receive at least one of system information and broadcast information, wherein the at least one of the system information and the broadcast information includes the indication information.

Optionally, the receiving module 810 is configured to receive the system information, wherein the system information includes a first parameter and a second parameter, the first parameter is used for indicating whether to reserve a cell for operator use, and the second parameter is used for indicating whether to reserve a cell for other use; receive the broadcast information, wherein the broadcast information includes master information block (MIB) information, and the MIB information includes first cell barring information; and read at least one of the first parameter and the second parameter and the first cell barring information to obtain the indication information.

Optionally, when content of the at least one of the first parameter and the second parameter and content of the first cell barring information satisfy a first reference condition, the indication information is used for indicating that the access of the other IAB base station is allowable; and when the content of the at least one of the first parameter and the second parameter and the content of the first cell barring information do not satisfy the first reference condition, the indication information is used for indicating that the access of the other IAB base station is not allowable.

Optionally, the first reference condition includes at least one of the followings: the first cell barring information indicates that access to the first IAB base station is barred, and the second parameter indicates to reserve the cell for other use; the first cell barring information indicates that access to the first IAB base station is barred, and the first parameter indicates to reserve the cell for operator use; the first cell barring information indicates that access to the first IAB base station is barred, and the first parameter indicates to reserve the cell for operator use, and the second parameter indicates to reserve the cell for other use; the first cell barring information indicates that access to the first IAB base station is barred, and the first parameter indicates to reserve the cell for operator use, or the second parameter indicates to reserve the cell for other use; the first cell barring information indicates that access to the first IAB base station is not barred, and the first parameter indicates to reserve the cell for operator use, and the second parameter indicates to reserve the cell for other use; and the first cell barring information indicates that access to the first IAB base station is not barred, and the second parameter indicates to reserve the cell for other use.

Optionally, the receiving module 810 is configured to receive the broadcast information, wherein the broadcast information includes master information block (MIB) information, and the indication information is located in the MIB information; and read the indication information in the MIB information.

Optionally, the receiving module 810 is configured to receive the system information, wherein the system information includes a first parameter and a second parameter, the first parameter is used for indicating whether to reserve a cell for operator use, and the second parameter is used for indicating whether to reserve a cell for other use; receive the broadcast information, wherein the broadcast information includes master information block (MIB) information, the MIB information carries second cell barring information, and the second cell barring information is used for indicating whether the first IAB base station is in an access barred status; and read at least the second cell barring information of the MIB information to obtain the indication information.

Optionally, the receiving module 810 is configured to read the second cell barring information of the MIB information to obtain the indication information; determine that the indication information indicates that the access of the other IAB base station is not allowable when the second cell barring information indicates that the first IAB base station is in an access barred status; and continue to read the at least one of the first parameter and the second parameter to obtain the indication information when the second cell barring information indicates that the first IAB base station is in an access non-barred status.

Optionally, when the second cell barring information indicates that the first IAB base station is in the access barred status, the indication information indicates that the access of the other IAB base station is not allowable; when the second cell barring information indicates that the first IAB base station is in the access non-barred status, and content of the at least one of the first parameter and the second parameter satisfies a second reference condition, the indication information indicates that the access of the other IAB base station is allowable; and when the second cell barring information indicates that the first IAB base station is in the access non-barred status, and the content of the at least one of the first parameter and the second parameter does not satisfy the second reference condition, the indication information indicates that the access of the other IAB base station is not allowable.

Optionally, the second reference condition includes at least one of the followings: the first parameter indicates not to reserve the cell for operator use, and the second parameter indicates not to reserve the cell for other use; and the first parameter indicates to reserve the cell for operator use.

Optionally, the receiving module 810 is configured to receive the broadcast information, wherein the broadcast information includes an additional bit other than MIB information, and the indication information is located in the additional bit; and read the indication information in the additional bit.

Optionally, the system information is system information block (SIB) 1 information.

In the embodiments of the present disclosure, the first IAB base station sends the indication information. Since the indication information is used for indicating whether the access of the other IAB base station to the first IAB base station is allowable, the second IAB base station may determine whether to access the first IAB base station after receiving the indication information. In this way, the access of the other IAB base station is individually controlled through the indication information, that is, the access control of the other IAB base station is separated from that of the UE, which improves the flexibility of access control of the IAB base station.

It should be noted that when the information indication device provided in the embodiments implements the information indication method, only a division of the functional modules is used as an example for illustration. In actual applications, the above functions may be allocated to be completed by different functional modules according to needs. An internal structure of the device is divided into different functional modules to complete all or part of the functions described above. In addition, the information indication device and the information indication method embodiments provided in the above embodiments belong to the same concept. For the specific implementation process of the information indication device, please refer to the method embodiments for details, which will not be repeated here.

Figure 9:
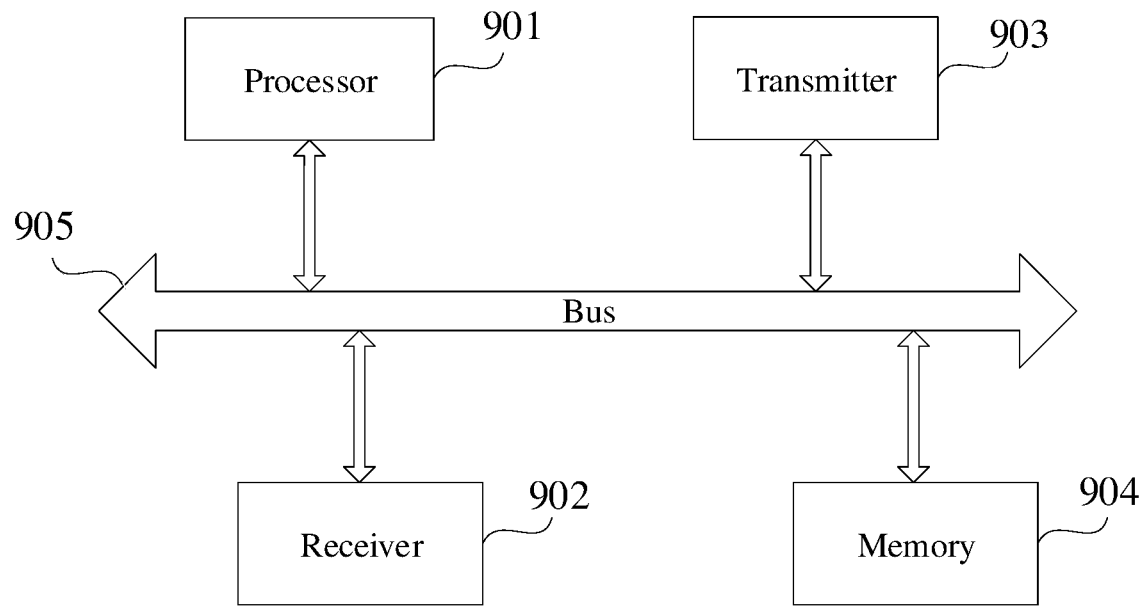
FIG. 9 is a schematic structural diagram showing a first IAB base station 900 provided by an embodiment of the present disclosure.

FIG. 9 shows a schematic structural diagram of a first IAB base station provided by an exemplary embodiment of the present disclosure. With reference to FIG. 9, the first IAB base station includes a processor 901, a receiver 902, a transmitter 903, a memory 904, and a bus 905.

The processor 901 includes one or more processing cores, and the processor 901 executes various functional applications and information processing by running software programs and modules.

The receiver 902 and the transmitter 903 may be implemented as one communication component, and the communication component may be a communication chip.

The memory 904 is connected to the processor 901 through the bus 905.

The memory 904 may be configured to store at least one instruction, and the processor 901 is configured to execute the at least one instruction, so as to implement each step executed by the first IAB base station in the foregoing method embodiments.

In addition, the memory 904 can be implemented by any type of volatile or non-volatile storage device or a combination thereof. The volatile or non-volatile storage device includes, but is not limited to a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

The present disclosure provides a computer-readable storage medium in which at least one instruction is stored, and the at least one instruction is loaded and executed by the processor to implement the information indication method provided by the foregoing method embodiments.

The present disclosure also provides a computer program product that, when running on a computer, causes the computer to execute the information indication method provided by the foregoing method embodiments.

Figure 10:
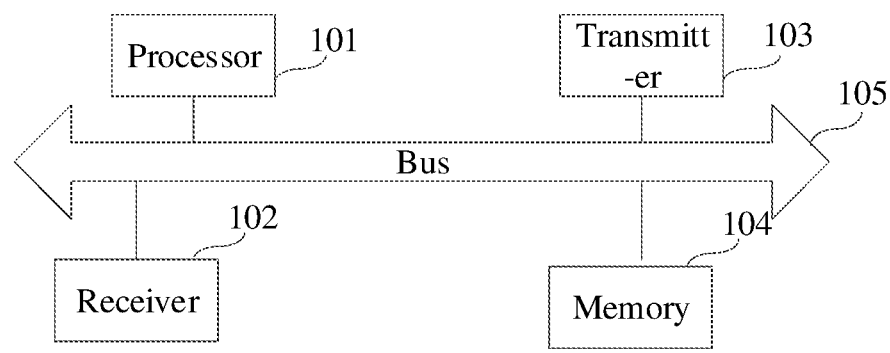
FIG. 10 is a schematic structural diagram showing a second IAB base station 1000 provided by an embodiment of the present disclosure.

FIG. 10 shows a schematic structural diagram of a second IAB base station provided by an exemplary embodiment of the present disclosure. With reference to FIG. 10, the second IAB base station includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as one communication component, and the communication component may be a communication chip.

The memory 104 is connected to the processor 101 through the bus 105.

The memory 104 may be configured to store at least one instruction, and the processor 101 is configured to execute the at least one instruction, so as to implement each step executed by the second IAB base station in the foregoing method embodiments.

In addition, the memory 104 can be implemented by any type of volatile or non-volatile storage device or a combination thereof. The volatile or non-volatile storage device includes, but is not limited to a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

The present disclosure provides a computer-readable storage medium in which at least one instruction is stored, and the at least one instruction is loaded and executed by the processor to implement the information indication method provided by the foregoing method embodiments.

The present disclosure also provides a computer program product that, when running on a computer, causes the computer to execute the information indication method provided by the foregoing method embodiments.

Those of ordinary skill in the art can understand that all or part of the steps in the foregoing embodiments can be implemented by hardware, or can be completed by a program to instruct relevant hardware, and the program may be stored in a computer-readable storage medium. The storage medium may be a read-only memory, a magnetic disk or an optical disk, and the like.

The above descriptions are only some embodiments of the present disclosure and are not intended to limit the present disclosure. Any modification, equivalent replacement, improvement and the like within the spirit and principle of the present disclosure shall be included in the protection scope of the present disclosure.

What is claimed is:

1. A method for information indication, which is applied to a first integrated access and backhaul (IAB) base station, comprising:
    sending indication information,
    wherein the indication information is used for indicating whether access of another IAB base station is allowable,
    wherein sending the indication information comprises:
    sending at least one of system information and broadcast information, wherein the at least one of the system information and the broadcast information comprises the indication information,
    wherein sending the at least one of the system information and the broadcast information comprises:
    sending the system information, wherein the system information comprises a first parameter and a second parameter, the first parameter is used for indicating whether to reserve a cell for operator use, and the second parameter is used for indicating whether to reserve a cell for other use; and
    sending the broadcast information, wherein the broadcast information comprises master information block (MIB) information, the MIB information carries second cell barring information, and the second cell barring information is used for indicating whether the first IAB base station is in an access barred status, wherein at least one of the first parameter and the second parameter and the second cell barring information of the MIB information constitute the indication information.

2. The method according to claim 1, wherein the system information is system information block (SIB) 1 information.

3. A method for information indication, which is applied to a second integrated access and backhaul (IAB) base station, comprising:

receiving indication information, wherein the indication information is used for indicating whether access of another IAB base station to a first IAB base station is allowable; and determining whether to access the first IAB base station based on the indication information, wherein receiving the indication information comprises:

receiving at least one of system information and broadcast information, wherein the at least one of the system information and the broadcast information comprises the indication information, wherein receiving the at least one of the system information and the broadcast information comprises:

receiving the system information, wherein the system information comprises a first parameter and a second parameter, the first parameter is used for indicating whether to reserve a cell for operator use, and the second parameter is used for indicating whether to reserve a cell for other use;

receiving the broadcast information, wherein the broadcast information comprises master information block (MIB) information, the MIB information carries second cell barring information, and the second cell barring information is used for indicating whether the first IAB base station is in an access barred status; and reading at least the second cell barring information of the MIB information to obtain the indication information.

4. The method according to claim 3, wherein the system information is system information block (SIB) 1 information.

5. A second IAB base station, comprising a processor and a memory, wherein the memory stores one or more computer programs that, when being executed by the processor, causes the processor to implement an information indication method comprising:

receiving indication information, wherein the indication information is used for indicating whether access of another IAB base station to a first IAB base station is allowable; and determining whether to access the first IAB base station based on the indication information, wherein receiving the indication information comprises:

receiving at least one of system information and broadcast information, wherein the at least one of the system information and the broadcast information comprises the indication information, wherein receiving the at least one of the system information and the broadcast information comprises:

receiving the system information, wherein the system information comprises a first parameter and a second parameter, the first parameter is used for indicating whether to reserve a cell for operator use, and the second parameter is used for indicating whether to reserve a cell for other use;

receiving the broadcast information, wherein the broadcast information comprises master information block (MIB) information, the MIB information carries second cell barring information, and the second cell barring information is used for indicating whether the first IAB base station is in an access barred status; and reading at least the second cell barring information of the MIB information to obtain the indication information.

6. The second IAB base station according to claim 5, wherein the system information is system information block (SIB) 1 information.

* * * * *